US011732683B2

(12) United States Patent
Zhao et al.

(10) Patent No.: US 11,732,683 B2
(45) Date of Patent: Aug. 22, 2023

(54) METHODS AND SYSTEM FOR OPERATING AN ENGINE

(71) Applicant: Ford Global Technologies, LLC, Dearborn, MI (US)

(72) Inventors: Yanan Zhao, Ann Arbor, MI (US); Jeffrey Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 17/302,456

(22) Filed: May 3, 2021

(65) Prior Publication Data

US 2022/0349371 A1  Nov. 3, 2022

(51) Int. Cl.
| | | |
|---|---|---|
| *F02N 11/08* | (2006.01) | |
| *B60K 6/24* | (2007.10) | |
| *B60K 6/26* | (2007.10) | |
| *B60K 6/28* | (2007.10) | |

(52) U.S. Cl.
CPC ............ *F02N 11/0811* (2013.01); *B60K 6/24* (2013.01); *B60K 6/26* (2013.01); *B60K 6/28* (2013.01); *F02N 2200/061* (2013.01); *F02N 2200/0801* (2013.01); *F02N 2200/102* (2013.01); *F02N 2200/124* (2013.01)

(58) Field of Classification Search
CPC ............ F02N 11/0803–0837; F02D 41/06–08
USPC .............. 701/112, 113; 123/179.3–179.4
See application file for complete search history.

(56) References Cited

U.S. PATENT DOCUMENTS

| | | | |
|---|---|---|---|
| 9,045,132 B1 | 6/2015 | Zhao et al. | |
| 9,415,773 B2* | 8/2016 | Johri | B60W 10/10 |
| 9,816,474 B2 | 11/2017 | Khafagy et al. | |
| 9,828,964 B1* | 11/2017 | Gabriel | F02N 11/0833 |
| 10,230,571 B2 | 3/2019 | Rangasamy et al. | |
| 10,408,183 B2 | 9/2019 | Leone et al. | |
| 2012/0077640 A1* | 3/2012 | Saito | F02N 11/0822 477/183 |
| 2013/0035839 A1* | 2/2013 | Otanez | F02N 11/0837 701/102 |
| 2015/0148192 A1* | 5/2015 | Lyon | B60W 10/06 477/203 |
| 2015/0210265 A1* | 7/2015 | Rademacher | H05B 3/84 701/112 |
| 2019/0010889 A1 | 1/2019 | Ferrara et al. | |
| 2019/0219019 A1* | 7/2019 | Khafagy | B60W 30/18018 |
| 2019/0368458 A1* | 12/2019 | Chen | B60W 20/40 |

FOREIGN PATENT DOCUMENTS

JP         2013180697 A      9/2013

* cited by examiner

*Primary Examiner* — Yi-Kai Wang
(74) *Attorney, Agent, or Firm* — David Kelley; McCoy Russell LLP

(57) ABSTRACT

Systems and methods for operating an engine that may be selectively automatically stopped and started are described. In one example, the method adjusts an amount of time that the engine may be inhibited from automatically stopping based on driver inputs such as driver demand pedal position, vehicle speed, and braking torque.

18 Claims, 8 Drawing Sheets

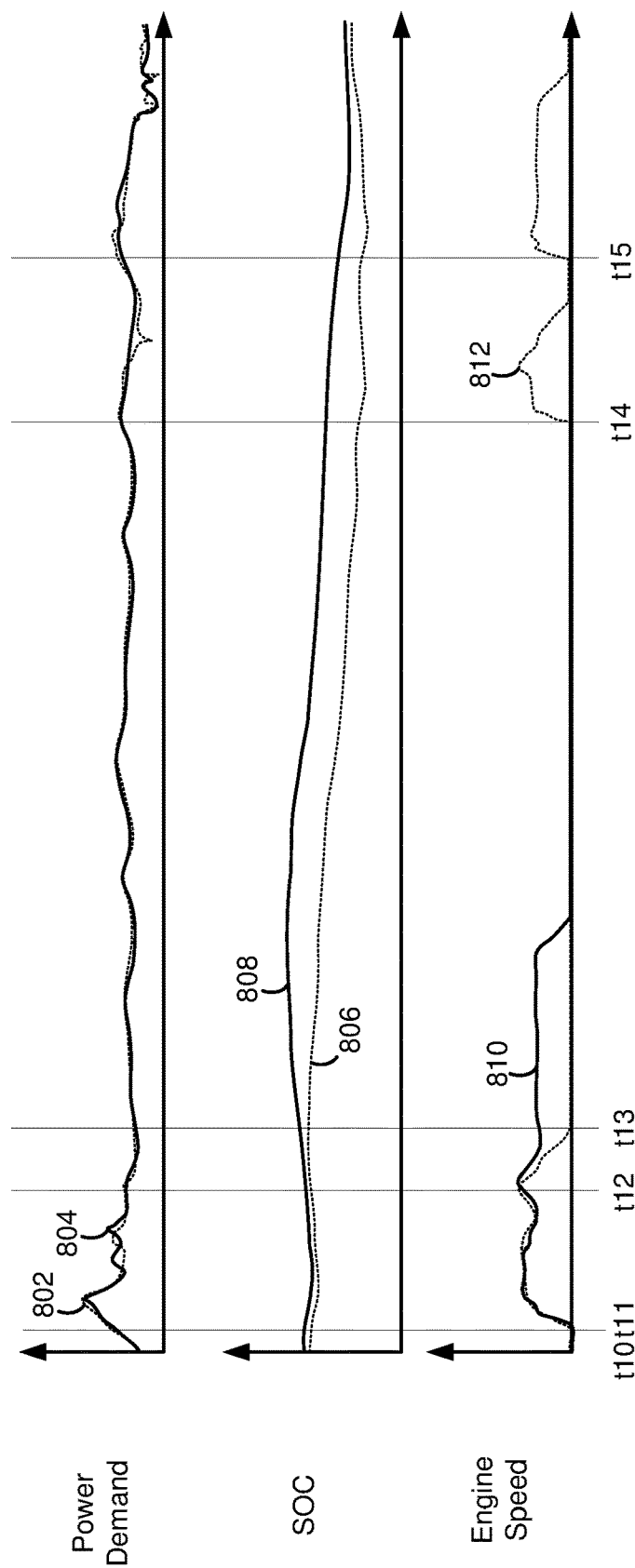

METHODS AND SYSTEM FOR OPERATING AN ENGINE

FIELD

The present description relates to methods and a system for managing operation of an engine that may be automatically stopped and started.

BACKGROUND AND SUMMARY

An engine and an electric machine may provide propulsive effort for a vehicle. The engine may be activated to provide propulsive effort to the vehicle and charge an electric energy storage device when driver demand torque is high or when an amount of electrical energy stored in an electric energy storage device is low. The engine may be automatically stopped such that it does not rotate and combust fuel when driver demand torque is low and when SOC is high. Stopping the engine may increase vehicle fuel efficiency, but restarting the engine via the starter reduces a total number of engine starts that may be provided by the starter. On the other hand, inhibiting engine stopping reduces starter use, but vehicle fuel economy may suffer. Therefore, it may be desirable to provide a way of stopping an engine so that the engine's starter lift span meets a desired life span while at least some reduction in fuel consumption may be preserved.

The inventors herein have recognized the above-mentioned issues and have developed a method for operating an engine, comprising: dynamically adjusting an amount of time automatic engine stop inhibit is activated via a controller; and automatically stopping the engine according to the amount of time automatic engine stop inhibit is activated.

By dynamically adjusting an amount of time automatic engine stop inhibit is activated, it may be possible to provide the technical result of reducing an actual total number of future engine starts. In particular, an amount of time that automatic engine stop inhibiting is activated may be shortened or increased based on driver inputs such as brake pedal position, driver demand pedal position, and vehicle speed. As a result, automatic engine stopping may be delayed so that the engine may not be automatically stopped and started in a short time interval. By reducing an actual total number of future engine stops and starts, it may be possible to extend a life span of an engine starter so that customer expectations of vehicle durability may be met.

The present description may provide several advantages. In particular, the approach may extend a life span of a starter. Further, the approach may provide for fuel consumption reductions while extending the life span of the starter. In addition, the approach may increase a state of charge of a battery to extend an amount of time that an engine may be automatically stopped so that the engine may not have to be automatically started repeatedly in a short time frame.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 7 and 8 show example engine operating sequences according to the method of FIGS. 3-6.

DETAILED DESCRIPTION

Figure 1:
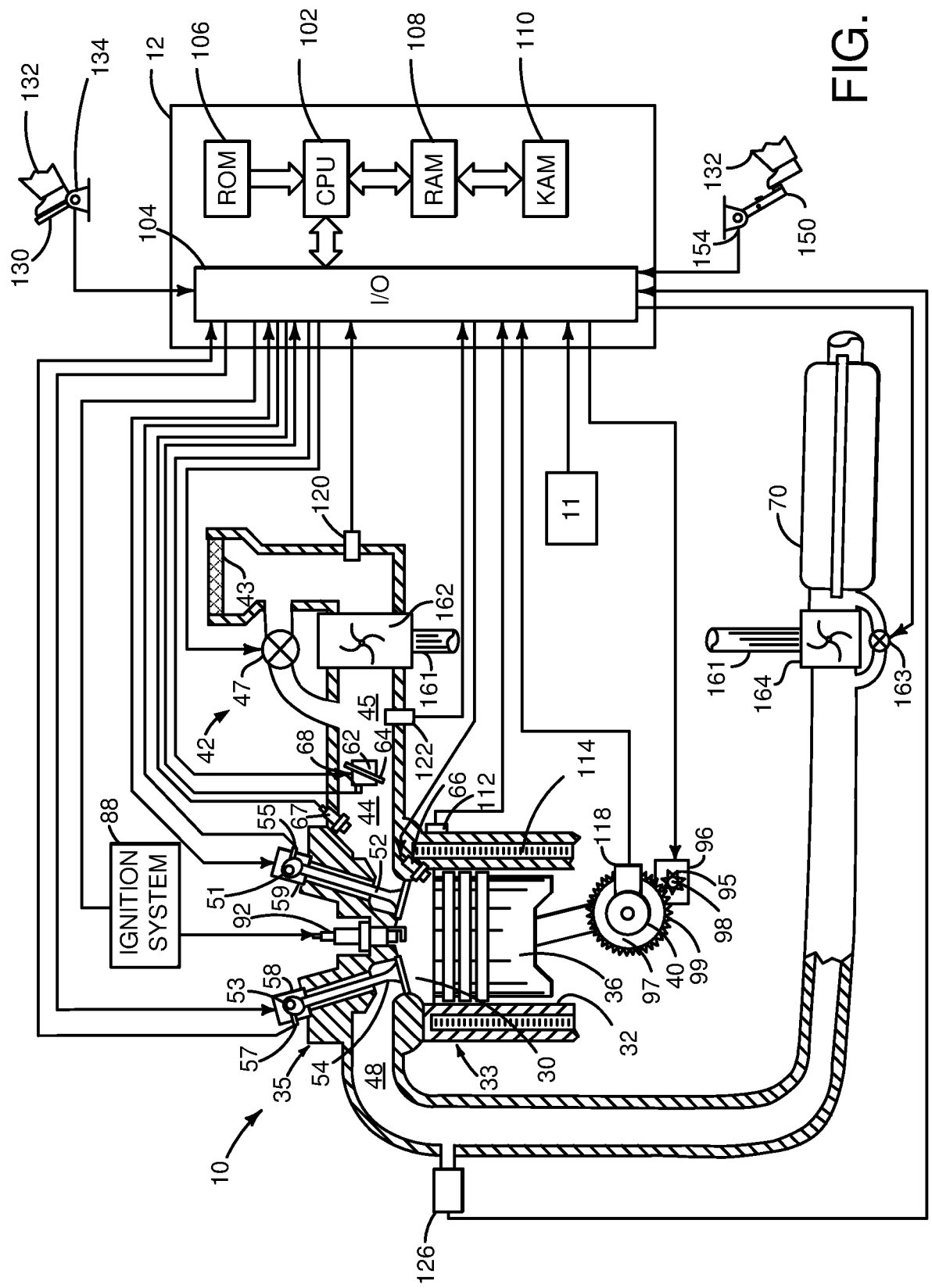
FIG. 1 is a schematic diagram of an engine.
Figure 2:
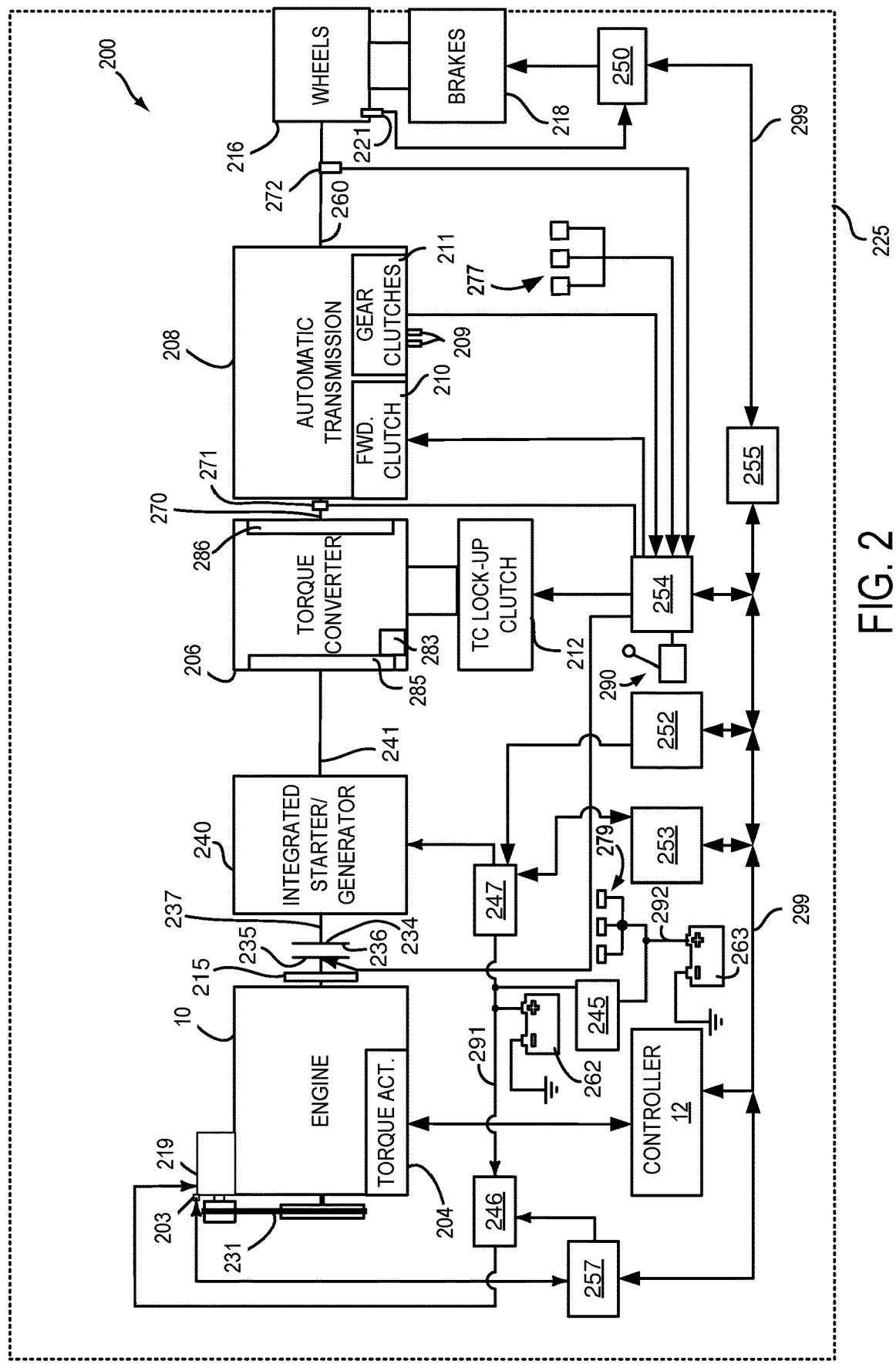
FIG. 2 is a schematic diagram of a vehicle driveline.
Figure 3:
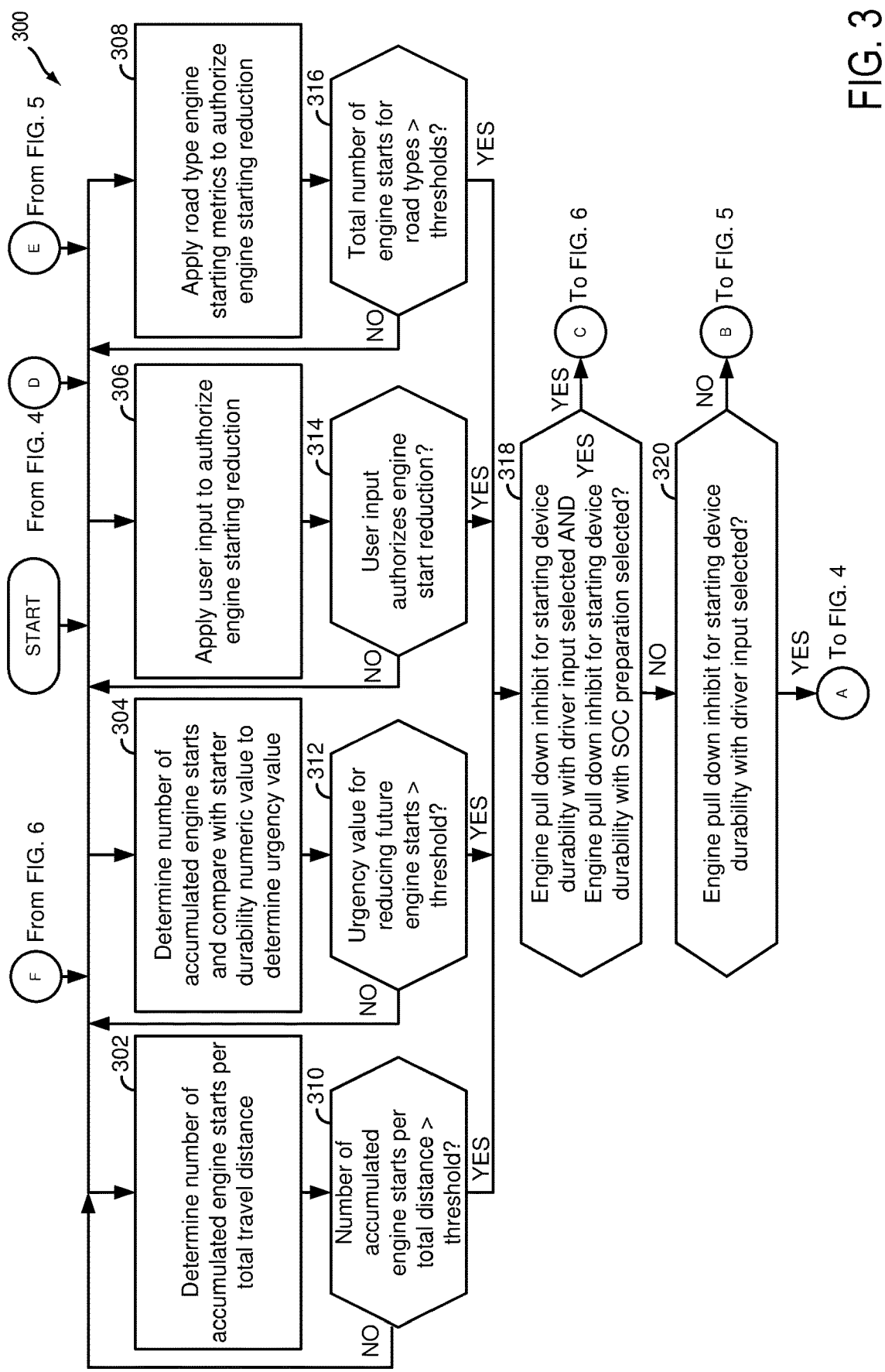
FIGS. 3-6 show a method for stopping and starting an engine.

The present description is related to inhibiting automatic stopping and starting of an engine. Automatic engine stopping may be inhibited during some conditions to extend a useful life span of a starter motor. In one example, a duration of an engine stop inhibit for automatic engine stopping may be dynamically adjusted so that at least some vehicle fuel economy related to automatic engine stopping may be preserved while increasing a life span of a starter motor. The starter may be included in a hybrid vehicle as shown in FIGS. 1 and 2. The hybrid vehicle may be operated according to the method of FIGS. 3-6. The engine may be operated via the method of FIGS. 3-6 as shown in FIGS. 7 and 8.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between BISG 219 and electric energy storage device 262. Likewise, inverter 247 converts DC power to AC power and vice-versa to enable power to be transferred between ISG 240 and electric energy storage device 262.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218.

In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output. Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N–m, ISG power is adjusted to provide less than 50 N–m (e.g., 49 N–m) of negative power at the wheels, including accounting for transmission gearing.

Thus, the system of FIGS. 1 and 2 provides for a system, comprising: an engine in a hybrid vehicle driveline; an electric machine that provides propulsive force to the hybrid vehicle driveline; a driver demand pedal; a traction battery that supplies power to the electric machine; and a controller including executable instructions stored in non-transitory memory that cause the controller to inhibit automatic engine stopping and starting in response to a state of charge of the traction battery being greater than a threshold state of charge, the threshold state of charge greater than a threshold state of charge for base engine stopping and starting logic. The system includes where the threshold state of charge is a calibratable constant (e.g., a value that may be adjusted via a human at time of vehicle manufacture). The system further comprises additional instructions to adjust an amount of time to inhibit automatic engine stopping and starting in response to vehicle speed. The system further comprises additional instructions to adjust an amount of time to inhibit automatic engine stopping and starting in response to driver demand pedal position and a rate of change of driver demand pedal position. The system further comprises additional instructions to adjust an amount of time to inhibit automatic engine stopping and starting in response to brake pedal position. The system includes where the threshold state of charge is an estimated value that is determined when a vehicle is operating in electric only mode from a time of a next engine pull down to a time of a next engine pull up. The system further comprises additional instructions to determine an urgency value for reducing an actual total number of future engine starts. The system further comprises additional instructions to reduce an actual total number of future engine starts in response to an actual total number of monitored engine stops and starts associated with road types.

Referring now to FIGS. 3-6, flowcharts of a method for operating an engine are shown. In particular, the method of FIGS. 3-6 may be applied to adjust an amount of time that automatic engine stopping may be inhibited so that a duty cycle (e.g., amount of usage) of a starter (e.g., 96 of FIG. 1) may be changed. The method of FIGS. 3-6 may be incorporated into and may cooperate with the system of FIGS. 1-2. Further, at least portions of the method of FIGS. 3-6 may be incorporated as executable instructions stored in non-transitory memory while other portions of the method may be performed via a controller transforming operating states of devices and actuators in the physical world.

Method 300 may perform the operations at steps 302-308 at substantially the same time to determine whether or not it is desirable to inhibit automatic engine stopping for starting device durability. In some examples, all of steps 302-308 may be performed by method 300. In other examples, fewer than all of the steps 302-308 may be performed by method 300. For example, only step 302 may be performed by method 300 in some examples.

At 302, method 300 determines an actual total number of accumulated engine starts that have been performed via the starter (e.g., 96 of FIG. 1) since the starter was installed in the vehicle that includes the starter divided by the distance that the vehicle has traveled since the starter was installed. In one example, an actual total number of accumulated engine starts performed by the starter since a starter was installed in a vehicle per total distance traveled by the vehicle since the starter was installed in the vehicle may be expressed as: Engstrtperdist=accstarts/distot, where Engstrtperdist is an actual total number of engine starts performed via a starter (e.g., 96 of FIG. 1) since the starter was installed into the vehicle per total distance traveled by the vehicle since the starter was installed in the vehicle, where accstarts is the total accumulated number of engine starts performed by the starter since the starter was installed in the vehicle, and where distot is a total distance traveled by the vehicle since the starter was installed in the vehicle. Method 300 proceeds to 310.

At 310, method 300 judges if the actual total number of accumulated engine starts that have been performed via the starter since the starter was installed divided by the distance that the vehicle in which the starter is installed has traveled since the starter was installed is greater than a threshold number. The threshold number may be based on starter durability projections. If method 300 judges that the actual total number of engine starts that have been performed via the starter since the starter was installed divided by the distance that the vehicle in which the starter is installed has traveled since the starter was installed is greater than a threshold number, the answer is yes and method 300 proceeds to 318. Otherwise, the answer is no and method 300 returns to 302-308.

At 304, method 300 determines an actual total number of accumulated engine starts that were performed by a starter since the starter was installed in the vehicle and compares the value to a starter durability number to determine an urgency value for reducing future engine starts. In one example, method 300 may determine a difference between the actual total number of accumulated engine starts that were performed by the starter since the starter was installed in the vehicle and the starter durability number. The result of the difference may be applied to index or reference a lookup table or a function that outputs an urgency value for reducing future engine starts. The values in the table may be empirically determined according to the expected lift span (e.g., an actual total number of engine starts that may be expected to be produced by the starter up to a time when the starter no longer starts the engine) of the starter. In one example, the urgency value for reducing an actual total number of future engine starts may increase as the actual total number of accumulated engine starts since a starter was installed in the vehicle increases. For example, the urgency value for reducing an actual total number of future engine starts may be 0.01 when the starter has started the engine 50 times. The urgency value may be 0.8 when the starter has started the engine 5,000 times. Method 300 proceeds to 312.

At 312, method 300 judges if the urgency value for reducing the actual total number of future engine starts is greater than a threshold value. The threshold value may be empirically determined according to starter durability data. If method 300 judges that the urgency value for reducing future engine starts is greater than the threshold value, the answer is yes and method 300 proceeds to 318. Otherwise, the answer is no and method 300 returns to 302-308.

At 306, method 300 determines if there is user (e.g., human) input to authorize a reduction of automatic engine starts. The user may supply input via a human/machine interface. For example, a user may authorize fewer automatic engine stops to conserve starter life after the starter has performed an amount of starts that is equivalent to 60% of the starters expected life span. Method 300 proceeds to 314 after determining whether or not a user has authorized a reduction in the number of automatic engine starts and stops.

At 314, method 300 judges if conditions have been met for a user authorized reduction of automatic engine starts and stops. For example, if the user wishes to reduce automatic engine stops and starts after the engine has been stopped and started 1,000 times, and the engine has been stopped and started 1,001 times, the answer is yes and method 300 proceeds to 318. Otherwise, the answer is no and method 300 returns to 302-308.

At 308, method 300 applies road types and metrics that may be associated with the road types to authorize or not authorize engine stopping and starting reduction (e.g., reducing an actual total number of engine stops and starts, thereby reducing a frequency of engine stopping and starting. A vehicle travel route may include a plurality of different road types (e.g., urban, rural, highway, etc.). The road types may serve as categories for metrics associated authorizing or not authorizing engine stopping and starting reduction. The metrics may include, but are not limited to, engine starting device durability limits or threshold for automatic engine stopping and starting (e.g., an actual total number of times an engine may be automatically stopped and started without authorizing a reduction in engine stopping and starting frequency), engine starting device durability limits or thresholds for all engine stops and starts (e.g., operator initiated engine stops and starts as well as automatic engine stops and starts), and engine starting device durability limits or thresholds for environmental conditions (e.g., engine stopping and starting limits for high ambient temperatures, high/low humidity environments, etc.). There may be different metrics for each road type, and the metrics for each road type may serve as a basis for determining whether or not engine stopping and starting reduction is authorized.

A vehicle travel route may include a plurality of road types and each road type may include one or more metrics as previously mentioned. For example, a drive cycle with an urban category may have an engine starting device durability limit or threshold of 70 automatic engine starts and stops. A drive cycle with highway category may have an engine starting device durability limit of 30 automatic engine stops and starts. A drive cycle with rural category may have an engine starting device durability limit of 50 automatic engine starts and stops. In this way, permission to commence automatic engine starting reduction actions may be linked with a travel route, geographic setting, road type, etc. so that engine starting reduction actions may be tailored to specific driving environments. By categorizing the travel conditions with automatic starting and stopping thresholds, it may be possible to respond to automatic engine starting and stopping events that may tend to degrade the starting device to a greater or lesser extent. Method 300 obtains the actual total number of engine starts for a certain number of trips that can be classified into the plurality of drive cycles with different roads or travel routes. Method 300 proceeds to 316.

At 316, method 300 judges if a total number of engine starts for each category mentioned at step 308 has been exceeded consistently (e.g., >60% of monitored trips). If so, the answer is yes and method 300 proceeds to 318. Otherwise, the answer is no and method 300 returns to steps 302-308. For example, method 300 may determine that 500 engine stops and starts have occurred during urban driving conditions where there is a projected number of engine starts for each category to comply with starting device durability limit of 900 engine stops and starts before automatic engine stop inhibit for future engine starting reduction are activated. Under such conditions, the answer at 316 is no and method 300 returns to 302-308. However, if method 300 determines that 1,000 engine stops and starts have occurred during urban driving conditions where the projected number of engine starts for each category to comply with starting device durability limit is 900 engine stops and starts before automatic engine stop inhibit, the answer is yes and method 900 proceeds to 318.

Figure 4:
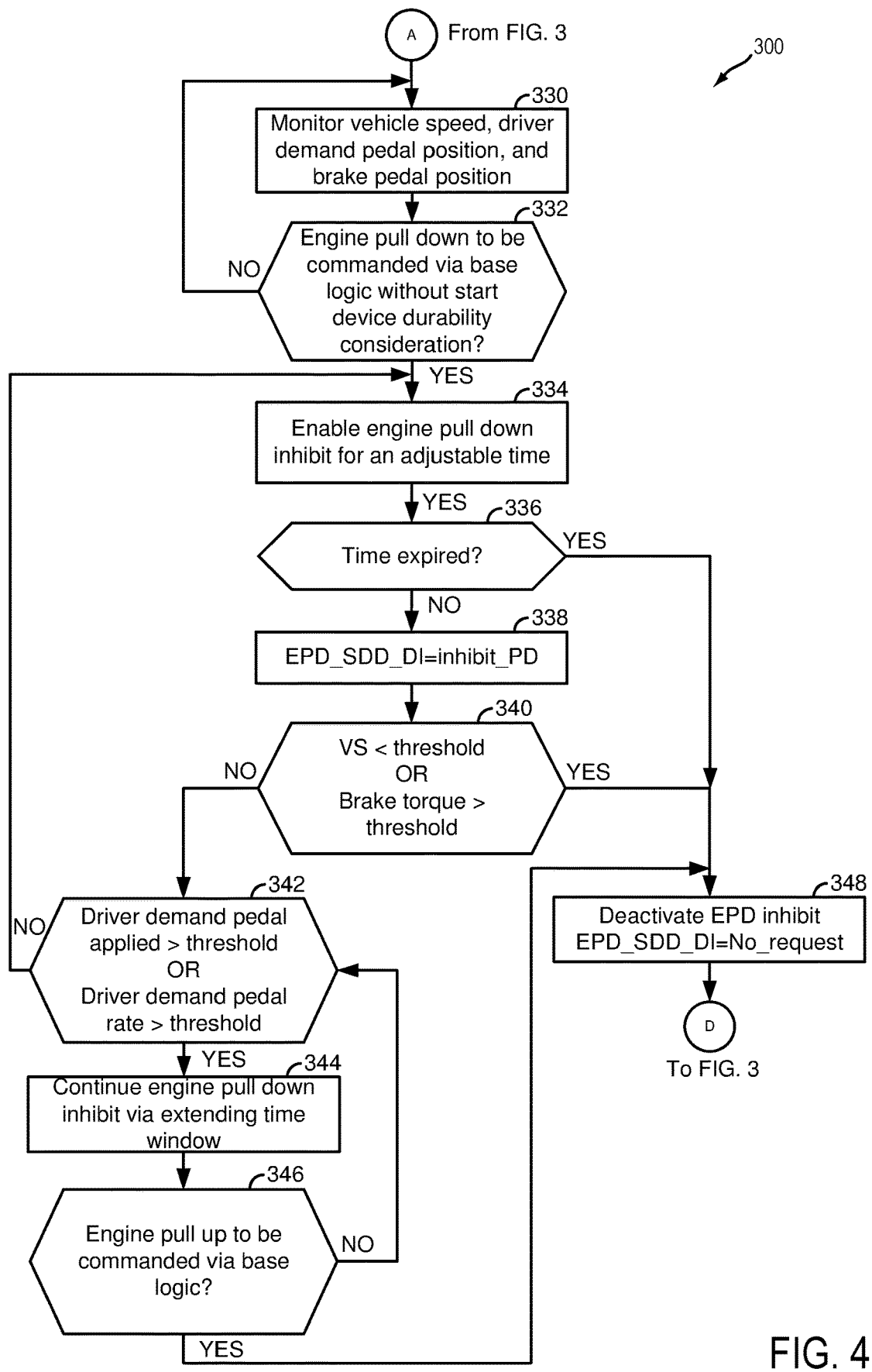
Figure 5:
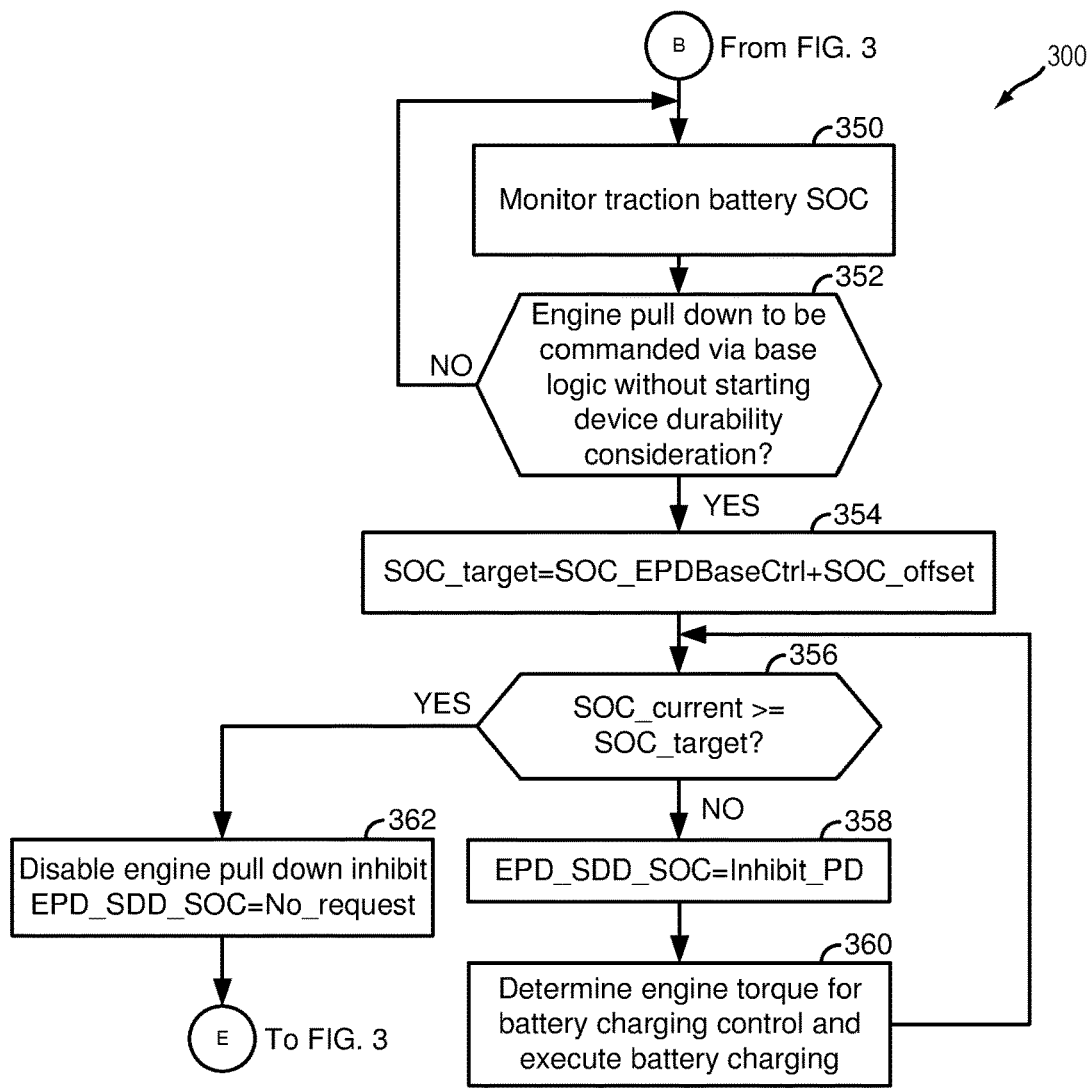
Figure 6:
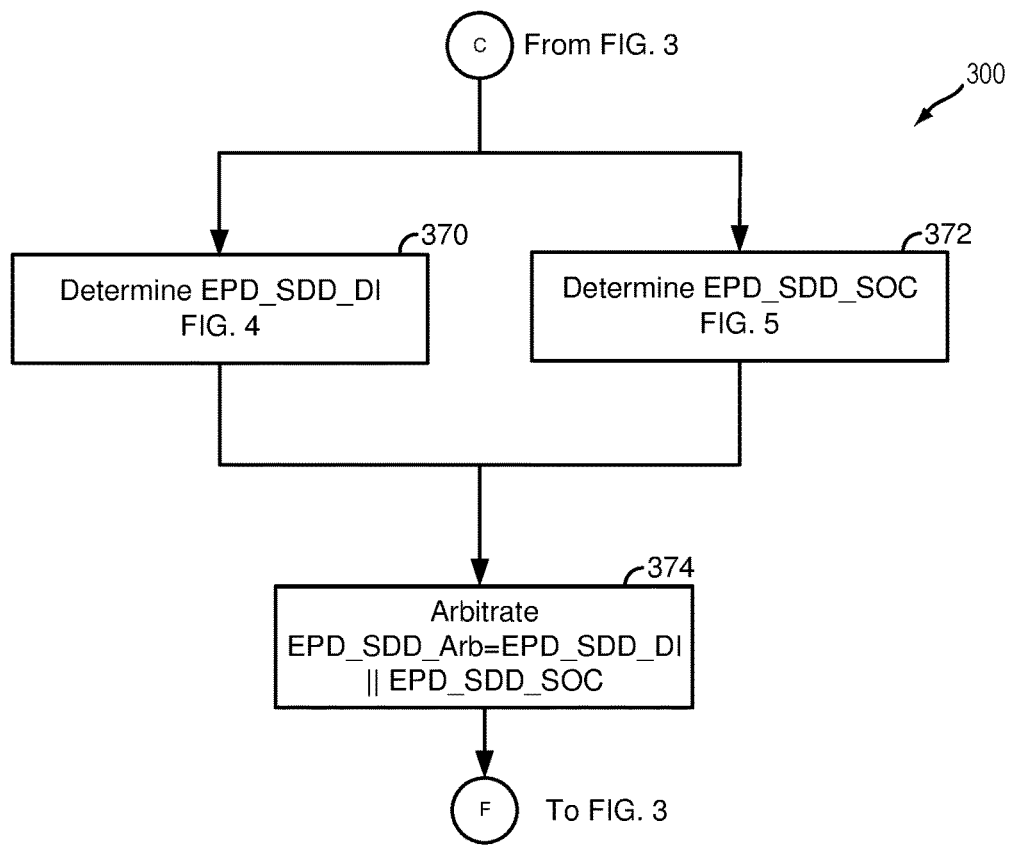
Figure 7:
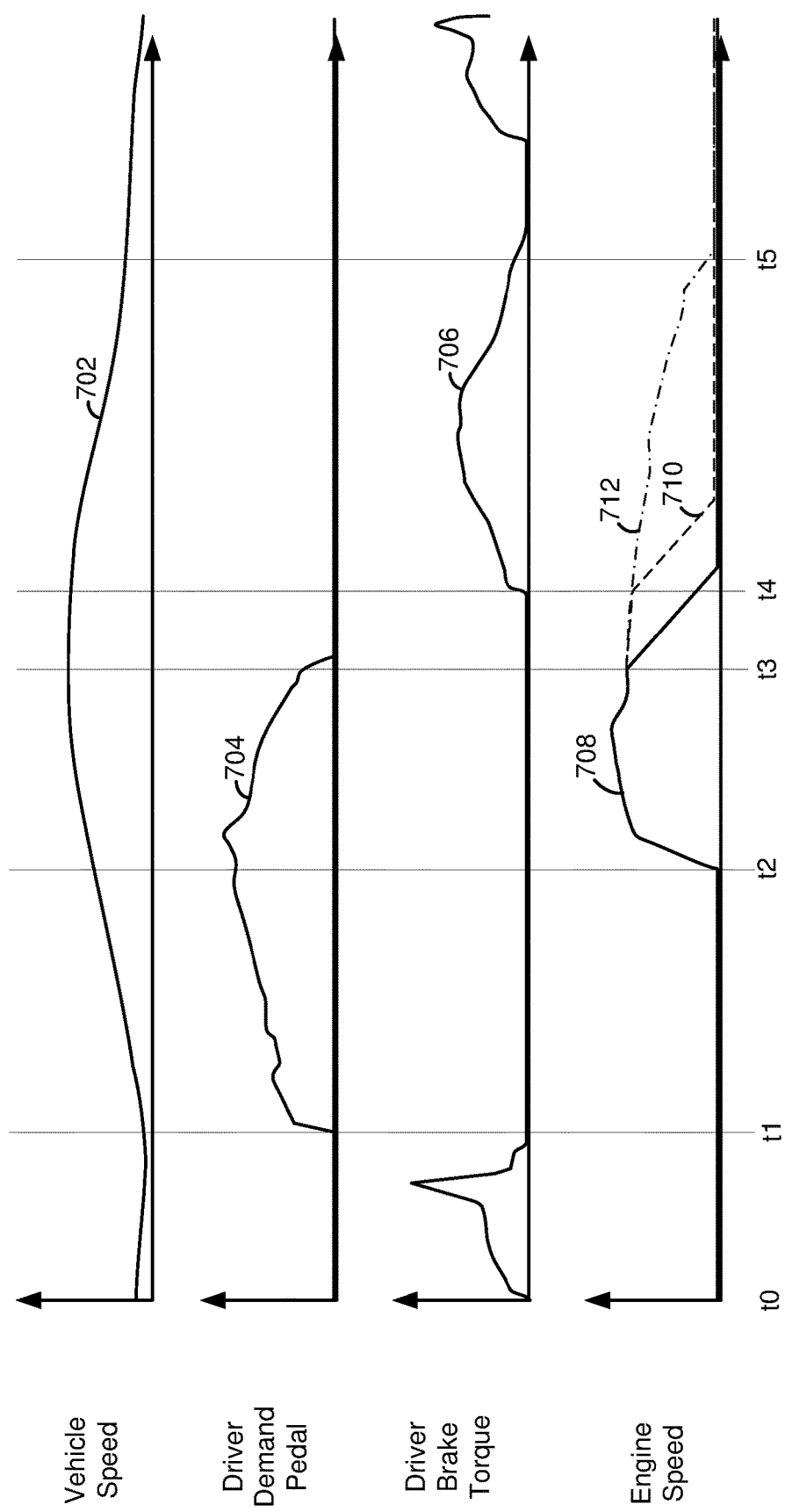

At 318, method 300 judges if engine pull down (e.g., automatic engine stopping where the engine does not rotate and fuel is not combusted in the engine) inhibit for engine starting device durability with driver input is selected (as shown in FIG. 4) and if engine pull down inhibit for engine starting device durability with electric energy storage device state of charge (SOC) is selected (as shown in FIG. 5), then the answer is yes and method 300 proceeds to 370 and 372 of FIG. 6. Otherwise, the answer is no and method 300 proceeds to 320. In one example, engine pull down inhibit for engine starting device durability with driver input is selected and if engine pull down inhibit for engine starting device durability with electric energy storage device state of charge may be selected via setting a particular variable in controller memory to a particular value or state via a calibration at a time of vehicle manufacture.

At 320, method 300 judges if engine pull down inhibit for engine starting device durability with driver input is selected (as shown in FIG. 4), the answer is yes and method 300 proceeds to 330 of FIG. 4. Otherwise, the answer is no and method 300 proceeds to 350 of FIG. 5. In one example, engine pull down inhibit for engine starting device durability with driver input is selected may be selected via setting a second particular variable in controller memory to a particular value via a calibration at a time of vehicle manufacture.

Referring now to 330 at FIG. 4, method 300 begins monitoring vehicle speed, driver demand pedal position, and brake pedal position. Step 330 begins a portion of method 300 that may be referred to as engine pull down control for engine starting device durability with driver input and vehicle operating information. Method 300 proceeds to 332.

At 332, method 300 judges if engine pull down is to be commanded via base automatic engine stop/start logic without engine starting device durability consideration. In other words, method 300 judges if conditions are present according to the base automatic engine stop/start logic to request an automatic engine stop. This judgement may be made without engine starting device durability consideration. The base automatic engine stop/start logic may request an automatic engine stop when driver demand is low and SOC is high, for example. If the base automatic engine stop/start logic conditions are not met for an automatic engine pull down, the answer is no and method 300 returns to 330. If engine pull down is to be commanded via base automatic engine stop/start logic without engine starting device durability consideration, the answer is yes and method 300 proceeds to 334.

At 334, method 300 enables automatic engine pull down inhibit for an adjustable amount of time. Method 300 permits inhibiting of automatic engine stopping to extend the life span of the starter. The amount of time that automatic engine stopping may be inhibited may be dynamically adjusted to compensate for vehicle operating conditions. In one example, method 300 initializes the engine pull down inhibit with a predetermined value (e.g., Cal_enaTime=10 seconds). Method 300 proceeds to 336.

At 336, method 300 judges if the adjustable amount of time (e.g., Cal_enaTime) has expired or passed since conditions were present according to the base automatic engine stop/start logic to request an automatic engine stop engine pull down. If so, the answer is yes and method 300 proceeds to 348. Otherwise, the answer is no and method 300 proceeds to 338.

At 338, method 300 inhibits automatic engine pull down. In one example, a variable (e.g., EPD_SDD_DI) is assigned a value or state that indicates that automatic engine stopping is inhibited. Thus, even though conditions are present for the base engine stop/start logic to automatically stop the engine, the engine is prevented from automatically stopping (e.g., stopping without a human requesting an engine stop via a device or an input to a controller that has a sole dedicated purpose of stopping and/or starting the engine, such as a key switch) via inhibiting automatic engine stopping. Method 300 proceeds to 340.

At 340, method 300 judges if vehicle speed (VS) is less than a first threshold vehicle speed threshold or if a braking torque (e.g., a torque to resist motion of a vehicle via friction brakes or regenerative braking) is greater than a threshold braking torque. Alternatively, method 300 may judge if vehicle speed is less than a first threshold vehicle speed threshold or if a brake pedal position is greater than a threshold brake pedal position. If so, the answer is yes and method 300 proceeds to 348. Otherwise, the answer is no and method 300 proceeds to 342. By canceling engine pull down inhibit when vehicle speed is less than a threshold or when braking torque is greater than a threshold, the engine may be prevented from running during conditions when engine efficiency is low. As such, fuel consumption may be reduced. In addition, the automatic engine stop inhibit may be cancelled before time since the most recent automatic engine stop inhibit reaches the predetermined initial inhibit time (e.g., 10 seconds). Thus, the amount of time that automatic engine stop inhibit is activated may be reduced to less than the predetermined initial inhibit time. The braking torque may be determined via a position of a brake pedal.

At 348, method 300 deactivates engine pull down (EPD) inhibit. In other words, method 300 permits automatic engine stopping. In one example, a variable (e.g., EPD_SDD_DI) is assigned a value that indicates that automatic engine stopping is not inhibited. Thus, the engine may be automatically stopped according to the base engine stop/start logic. For example, the engine may be automatically stopped when driver demand torque or power is less than a threshold while battery state of charge is greater than a threshold according to the base engine stop/start logic. The engine may be automatically started in response to driver demand being greater than a threshold and battery state of charge being less than a threshold according to the base engine stop/start logic. Method 300 returns to 302-308.

At 342, method 300 judges if the driver demand pedal position is greater than a threshold position or if a driver demand pedal rate of change is greater than a threshold rate of change. If so, the answer is yes and method 300 proceeds to 344. Otherwise, the answer is no and method 300 returns to 334. By determining if the driver demand pedal position is greater than a threshold position or if a driver demand pedal rate of change is greater than a threshold rate of change, it may be possible to prevent an engine pull up (e.g., an engine start) immediately after an engine pull down. In particular, the engine may be prevented from being stopped so that it does not have to be restarted when driver demand may be increasing and when an engine start would have occurred if the engine had been stopped.

At 344, method 300 continues to extend the amount of time that automatic engine stop inhibit is active or in force. The amount of time that the automatic engine stop inhibit is active may be extended to a time that is greater than the predetermined amount of time described at 334. Method 300 proceeds to 346.

At 346, method 300 judges if the engine is to be pulled up or started via the base engine stop/start logic. For example, if driver demand torque is greater than a threshold or if battery state of charge is less than a threshold, the base engine stop/start logic may command an automatic engine start. If method 300 judges that engine pull up is to be commanded by the base engine stop/start logic, the answer is yes and method 300 proceeds to 348. Otherwise, the answer is no and method 300 returns to 342.

Referring now to FIG. 5, method 300 monitors the traction battery SOC. Method 300 may monitor the traction battery SOC via monitoring voltage of the traction battery and electrical current that enters and exits the traction battery. Method 300 proceeds to 352.

At 352, method 300 judges if engine pull down is to be commanded via base automatic engine stop/start logic without engine starting device durability consideration. In other words, method 300 judges if conditions are present according to the base automatic engine stop/start logic to request an automatic engine stop. This judgement may be made without engine starting device durability consideration. The base automatic engine stop/start logic may request an automatic engine stop when driver demand is low and SOC is high, for example. If the base automatic engine stop/start logic conditions are not met for an automatic engine pull down, the answer is no and method 300 returns to 350. If engine pull down is to be commanded via base automatic engine stop/start logic without engine starting device durability consideration, the answer is yes and method 300 proceeds to 354.

At 354, method 300 determines a SOC target or requested value for the traction battery. In one example, the SOC target may be expressed via the following equation: SOC_target=SOC_PwrEPDBaseCtrl+SOC_offset, where SOC_target is the SOC target value, SOC_EPDBaseCtrl is a threshold level above which engine pull down is permitted from a battery SOC perspective with base engine stop control, and SOC_offset is positive value that may be a calibratable (e.g., human adjustable), or an estimated SOC use by the vehicle operating mode (e.g., when vehicle propulsive effort is provided solely via ISG 240) from a time of a next or subsequent engine pull down to a time of a next or subsequent engine pull up. Method 300 proceeds to 356.

At 356, method 300 judges if the present SOC for the traction battery is greater than or equal to the target SOC. If so, the answer is yes and method 300 proceeds to 362. Otherwise, the answer is no and method 300 proceeds to 358.

At 362, method 300 deactivates engine pull down (EPD) inhibit. In other words, method 300 permits automatic engine stopping. In one example, a variable (e.g., EPD_SDD_SOC) is assigned a value that indicates that automatic engine stopping is not inhibited. Thus, the engine may be automatically stopped according to the base engine stop/start logic. For example, the engine may be automatically stopped when driver demand torque or power is less than a threshold while battery state of charge is greater than a threshold according to the base engine stop/start logic. The engine may be automatically started in response to driver demand being greater than a threshold and battery state of charge being less than a threshold according to the base engine stop/start logic. Method 300 returns to 302-308.

At 358, method 300 inhibits automatic engine pull down. In one example, a variable (e.g., EPD_SDD_SOC) is assigned a value that indicates that automatic engine stopping is inhibited. Thus, even though conditions are present for the base engine stop/start logic to automatically stop the engine, the engine is prevented from automatically stopping via inhibiting automatic engine stopping. Method 300 proceeds to 360.

At 360, method 300 determines a requested engine torque for traction battery charging control. Method 300 also adjusts engine output and charges the traction battery via the ISG. In one example, the engine torque is adjusted to the driver demand torque plus a traction battery charging torque. The traction battery charging torque may be a torque that charges the traction battery and permits the engine to operate within a desired engine efficiency range. In one example, the traction battery charging torque may be a function of traction battery SOC, engine speed, engine load, and ambient temperature. The traction battery charging torque may be determined via a table or a function that outputs traction battery charging torque when the table or function is referenced via traction battery SOC, engine speed, engine load, and ambient temperature. Method 300 returns to 356.

Steps 350-362 may increase the traction battery SOC at which engine pull down is permitted. In other words, engine pull down may be inhibited at higher traction battery SOC levels than the base engine stop/start logic. In addition, steps 350-362 may increase the engine pull up threshold for automatic engine starting as compared to the base engine stop/start logic so that the engine may remained stopped for a longer period of time.

Referring now to FIG. 6, at 370, method 300 may perform the steps 330-348 of FIG. 4 to determine the content of variable EPD_SDD_DI. Method 300 may also determine the content of variable EPD_SDD_SOC by performing steps 350-362 of FIG. 5. Method 300 proceeds to 374.

At 374, method 300 arbitrates between the contents of variable EPD_SDD_DI and the contents of variable EPD_SDD_SOC to determine whether or not automatic engine stopping and starting is to be inhibited. In one example, the variable EPD_SDD_DI may contain an inhibit request that is based on driver input (e.g., Inhibit_PD (inhibit automatic engine pull down) or No_request (no automatic engine pull down inhibit request)). Likewise, the variable EPD_SDD_SOC may contain an inhibit request that is based on driver input (e.g., Inhibit_PD (inhibit automatic engine pull down) or No_request (no automatic engine pull down inhibit request)). Method 300 may perform a logical OR operation in the contents of EPD_SDD_DI and EPD_SDD_SOC, where Inhibit_PD values are logical TRUE and No_request values are logical FALSE. The Inhibit_PD values may have higher priority than the No_request values. The arbitration logic allows lower SOC values to require a higher braking torque level to exit engine pull down inhibit and the lower the SOC, the lower driver demand pedal position is required to extend engine pull down inhibit. The engine may be automatically stopped according to the base engine stop/start logic according to the state or values of EPD_SDD_DI and EPD_SDD_SOC. For example, the engine may be automatically stopped when driver demand torque or power is less than a threshold while battery state of charge is greater than a threshold according to the base engine stop/start logic. The engine may be automatically started in response to driver demand being greater than a threshold and battery state of charge being less than a threshold according to the base engine stop/start logic. Method 300 inhibits automatic engine pull down responsive to the arbitration at 374. Method 300 returns to steps 302-308.

In this way, driver demand input and SOC may be a basis for dynamically adjusting an amount of time that automatic engine stopping is inhibited. The driver demand input may include driver demand pedal position and brake pedal position.

Thus, the method of FIGS. 3-6 provides for a method for operating an engine, comprising: dynamically adjusting an amount of time automatic engine stop inhibit is activated via a controller; and automatically stopping the engine according to the amount of time automatic engine stop inhibit is activated. The method includes where dynamically adjusting the amount of time automatic engine stop inhibit is activated includes adjusting the amount of time automatic engine stop inhibit is activated in response to driver demand pedal position. The method includes where dynamically adjusting the amount of time automatic engine stop inhibit is activated includes adjusting the amount of time automatic engine stop inhibit is activated in response to brake pedal position. The method includes where dynamically adjusting an amount of time automatic engine stop inhibit is activated via the controller includes reducing the amount of time automatic engine stop is inhibited from a predetermined time. The method includes where dynamically adjusting an amount of time automatic engine stop inhibit is activated via the controller includes increasing the amount of time automatic engine stop is inhibited from a predetermined time. The method includes where dynamically adjusting the amount of time automatic engine stop inhibit is activated includes adjusting the amount of time automatic engine stop inhibit is activated in response to a vehicle speed. The method includes where dynamically adjusting the amount of time automatic engine stop inhibit is activated includes adjusting the amount of time automatic engine stop inhibit is activated in response to a rate of driver demand pedal position change.

The method of FIGS. 3-6 also provides for a method for operating an engine, comprising: authorizing a reduction in an actual total number of future engine starts via a controller in response to a an actual total number of engine stops and starts that are categorized by road type, and where there is an engine starting metric associated with the road type; and inhibiting automatically stopping the engine according to the authorization. The method includes where the road types include highways, rural roads, and urban roads. The method further comprises inhibiting automatic stopping of the engine in response to human user input to a machine interface. The method further comprises dynamically adjusting an amount of time automatic engine stop inhibit is activated in response to brake pedal position. The method further comprises dynamically adjusting an amount of time automatic engine stop inhibit is activated in response to vehicle speed.

Referring now to FIG. 7, an example prophetic engine operating sequence according to the method of FIGS. 3-6 and other operating strategies is shown. The example sequence may be provided by the system of FIGS. 1 and 2 in cooperation with the method of FIGS. 3-6. The plots are aligned in time and occur at a same time. The vertical lines at t0-t5 indicate times of particular interest. FIG. 7 shows a comparison of three different automatic engine stopping and starting strategies. Two of the strategies include automatic engine stop/start inhibit.

The first plot from the top of FIG. 7 is a plot of vehicle speed versus time. The vertical axis represents vehicle speed and the vehicle speed increases in the direction of the vertical axis arrow. The horizontal axis represents time and the time increases from the left side of the figure to the right side of the figure. Trace 702 represents the vehicle speed.

The second plot from the top of FIG. 7 is a plot of driver demand pedal position versus time. The vertical axis represents driver demand pedal position and the driver demand pedal position increases in the direction of the vertical axis arrow. The horizontal axis represents time and the time increases from the left side of the figure to the right side of the figure. Trace 704 represents the driver demand pedal position.

The third plot from the top of FIG. 7 is a plot of driver requested braking torque versus time. The vertical axis represents driver requested braking torque and the driver requested braking torque increases in the direction of the vertical axis arrow. The horizontal axis represents time and the time increases from the left side of the figure to the right side of the figure. Trace 706 represents the driver requested braking torque.

The fourth plot from the top of FIG. 7 is a plot of engine speed versus time. The vertical axis represents the engine speed and the engine speed increases in the direction of the vertical axis arrow. Engine speed is zero at the level of the horizontal axis. The horizontal axis represents time and the time increases from the left side of the figure to the right side of the figure. Trace 708 represents the engine speed when the engine is operated with only base automatic engine stop/start logic. Trace 710 represents engine speed when the engine is operated according to the method of FIGS. 3-6 and base automatic engine stop/start logic. Trace 712 represents engine speed when base automatic engine stop/start logic is combined with automatic engine stop inhibit control that inhibits automatic engine stop for a fixed amount of time. Trace 710 represents engine speed when automatic engine stop inhibit is dynamically controlled and/or adjusted according to SOC and human driver input. The engine speeds are all equal when only solid line trace 708 is visible.

At time t0, vehicle speed is low and the driver demand pedal is not applied. The brake pedal is applied and the braking torque request begins increasing and the engine is stopped.

At time t1, the driver demand pedal position is increased from zero and the vehicle speed begins to increase. The brake pedal is not applied so that the braking torque is zero. The engine is not started and the vehicle is propelled via the vehicle's electric machine (not shown).

At time t2, the engine is started in response to the higher driver demand pedal position and the vehicle speed continues to increase, and the increase of corresponding driver demand power (not shown). The engine speed increases after the engine is started. The driver demand pedal position begins to be reduced between time t2 and time t3.

At time t3, the driver demand pedal position or the corresponding driver demand power (not shown) is low enough to allow the base engine stop/start logic to stop the engine to conserve fuel. Thus, the engine speed for an engine that may be automatically stopped and started according to base stop/start logic begins to decrease. The engine that includes base engine stop/start logic and the method of FIGS. 3-6 continues to operate as does the engine that includes base stop/start logic and fixed engine stop inhibit control.

At time t4, the driver demand pedal position is zero and the braking torque request begins to increase. The vehicle speed is being reduced as the braking torque is applied to slow the vehicle. The engine speed for an engine that may be automatically stopped and started according to base engine stop/start logic is approaching zero. The engine speed for the engine that includes base engine stop/start logic and the method of FIGS. 3-6 begins to be reduced. This action may permit fuel consumption to be reduced as compared to if a fixed duration engine stop inhibit is provided. The engine continues to operate for the engine that includes the base engine stop/start logic and fixed engine stop inhibit control.

At time t5, the vehicle speed continues decreasing and driver demand pedal position is zero. The driver requested braking torque is approaching zero. The engine speed for an engine that may be automatically stopped and started according to base engine stop/start logic is zero. The speed of the engine that includes base engine stop/start logic and the method of FIGS. 3-6 is also zero. The engine that includes the base engine stop/start logic and fixed engine stop inhibit control timing is stopped at time t5.

Thus, the method of FIGS. 3-6 allows engine stop/start inhibit to be deactivated at different times. In some examples, the engine stop/start inhibit may be cancelled based on battery SOC. In other examples, the engine stop/start inhibit may be cancelled based on human driver inputs such as driver demand pedal position and brake pedal position or requested braking torque.

Referring now to FIG. 8, an example prophetic engine operating sequence according to the method of FIGS. 3-6 and other operating strategies is shown. The example sequence may be provided by the system of FIGS. 1 and 2 in cooperation with the method of FIGS. 3-6. The plots are aligned in time and occur at a same time. The vertical lines at t10-t15 indicate times of particular interest.

The first plot from the top of FIG. 8 is a plot of driver power demand versus time. The vertical axis represents driver power demand and the driver power demand increases in the direction of the vertical axis arrow. The horizontal axis represents time and the time increases from the left side of the figure to the right side of the figure. Dashed trace 802 represents the driver power demand for an engine that includes only base engine stop/start logic. Solid trace 804 represents driver power demand for an engine that includes base engine stop/start logic and the engine stop/start engine inhibit control logic of FIGS. 3-6.

The second plot from the top of FIG. 8 is a plot of traction battery SOC versus time. The vertical axis represents traction battery SOC and traction battery SOC increases in the direction of the vertical axis arrow. The horizontal axis represents time and the time increases from the left side of the figure to the right side of the figure. Dashed trace 806 represents the traction battery SOC for an engine that includes only base engine stop/start logic. Solid trace 808 represents traction battery SOC for an engine that includes base engine stop/start logic and the engine stop/start engine inhibit control logic of FIGS. 3-6.

The third plot from the top of FIG. 8 is a plot of engine speed versus time. The vertical axis represents engine speed and engine speed increases in the direction of the vertical axis arrow. The horizontal axis represents time and the time increases from the left side of the figure to the right side of the figure. Dashed trace 812 represents engine speed for an engine that includes only base engine stop/start logic. Solid trace 810 represents the engine speed for an engine that includes base engine stop/start logic and the engine stop/start engine inhibit control logic of FIGS. 3-6.

At time t10, the power demands for the engine that includes only base engine stop/start logic and the engine that includes base engine stop/start logic and the engine stop/start inhibit control of FIGS. 3-6 are at low levels. The traction battery SOC levels for the engine that includes only base engine stop/start logic and the engine that includes base engine stop/start logic and the engine stop/start inhibit control of FIGS. 3-6 are at middle levels. The engine speeds for the engine that includes only base engine stop/start logic and the engine that includes base engine stop/start logic and the engine stop/start inhibit control of FIGS. 3-6 are zero.

At time t11, the power demands for the engine that includes only base engine stop/start logic and the engine that includes base engine stop/start logic and the engine stop/start inhibit control of FIGS. 3-6 are at levels that cause the engines to start. The traction battery levels for the engine that includes only base engine stop/start logic and the engine that includes base engine stop/start logic and the engine stop/start inhibit control of FIGS. 3-6 are at middle levels.

At time t12, the power demands for the engine that includes only base engine stop/start logic and the engine that includes base engine stop/start logic and the engine stop/start inhibit control of FIGS. 3-6 are at reduced levels that cause the engine that includes only the base engine stop start/logic to stop (cease combustion), thereby causing its speed to be reduced. The engine that includes the engine stop/start inhibit control of FIGS. 3-6 continues to operate (combust fuel). Operating the engine that includes the engine stop/start control of FIGS. 3-6 allows traction battery SOC for the engine that includes the engine stop/start control of FIGS. 3-6 to increase. SOC of the engine that includes only the base engine stop/start logic begins decreasing as it is applied to meet the driver power demand.

At time t13, the speed of the engine that includes only base engine stop/start logic is reduced to zero. The power demands for the engine that includes only base engine stop/start logic and the engine that includes base engine stop/start logic and the engine stop/start inhibit control of FIGS. 3-6 are at reduced levels. The engine that includes the engine stop/start inhibit control of FIGS. 3-6 continues to operate, but it is stopped between time t13 and time 14.

At times t14, the power demands for the engine that includes only base engine stop/start logic and the engine that includes base engine stop/start logic and the engine stop/start inhibit control of FIGS. 3-6 are at middle levels. The traction battery SOC level for the engine that includes only base engine stop/start logic is lower than a threshold level causing an engine restart for the engine that includes only base engine stop/start logic. The traction battery SOC level for the engine that includes base engine stop/start logic and the engine stop/start inhibit control of FIGS. 3-6 is at higher level than the threshold for engine starting, which allows the engine that includes the base stop/start logic and the engine stop/start inhibit control of FIGS. 3-6 to remain stopped. The engine that includes only the base engine stop/start logic is started at time t14 in response to traction battery SOC so that the SOC of the traction battery for the system that includes the engine that has only base stop/start logic may be increased and/or to have sufficient powertrain power capability to meet the drive power demand. The engine that includes only the base engine stop/start logic is stopped again between time t14 and time t15.

At times t15, the power demands for the engine that includes only base engine stop/start logic and the engine that includes base engine stop/start logic and the engine stop/start inhibit control of FIGS. 3-6 are at middle levels. The traction battery SOC level for the engine that includes only base engine stop/start logic is lower than a threshold level causing an engine restart for the engine that includes only base engine stop/start logic. The traction battery SOC level for the engine that includes base engine stop/start logic and the engine stop/start inhibit control of FIGS. 3-6 is at a higher level than the threshold for engine starting, which allows the engine that includes the base stop/start logic and the engine stop/start inhibit control of FIGS. 3-6 to remain stopped.

In this way, the method of FIGS. 3-6 may inhibit automatic engine stopping to increase SOC of a traction battery so that an engine may be stopped for a longer amount of time. By stopping the engine for a longer amount of time, it may be possible to reduce a total number of engine starts that a starter assists engine starting.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
dynamically adjusting an amount of time automatic engine stop inhibit is enabled via a controller, where dynamically adjusting an amount of time automatic engine stop inhibit is enabled via the controller includes reducing the amount of time automatic engine stop is inhibited from a predetermined time; and
automatically stopping the engine in response to the amount of time automatic engine stop inhibit is enabled since conditions for base automatic engine stopping logic to request an automatic engine stop were present having passed.

2. The method of claim 1, where dynamically adjusting the amount of time automatic engine stop inhibit is activated also includes adjusting the amount of time automatic engine stop inhibit is activated in response to driver demand pedal position.

3. The method of claim 1, where dynamically adjusting the amount of time automatic engine stop inhibit is activated also includes adjusting the amount of time automatic engine stop inhibit is activated in response to brake pedal position.

4. The method of claim 1, where dynamically adjusting an amount of time automatic engine stop inhibit is activated via the controller includes increasing the amount of time automatic engine stop is inhibited from a predetermined time.

5. The method of claim 1, where dynamically adjusting the amount of time automatic engine stop inhibit is activated also includes adjusting the amount of time automatic engine stop inhibit is activated in response to a vehicle speed.

6. The method of claim 1, where dynamically adjusting the amount of time automatic engine stop inhibit is activated also includes adjusting the amount of time automatic engine stop inhibit is activated in response to a rate of driver demand pedal position change.

7. A system, comprising:
an engine in a hybrid vehicle driveline;
an electric machine that provides propulsive force to the hybrid vehicle driveline;
a driver demand pedal;
a traction battery that supplies power to the electric machine; and
a controller including executable instructions stored in non-transitory memory that cause the controller to deactivate inhibiting automatic engine stopping and starting in response to a state of charge of the traction battery being greater than a first threshold, and the first threshold state of charge is greater than a second threshold for base engine stopping and starting logic, and further comprising additional instructions to determine an urgency value for reducing an actual total number of future engine starts.

8. The system of claim 7, where the first threshold is a calibratable constant.

9. The system of claim 7, further comprising additional instructions to adjust an amount of time to inhibit automatic engine stopping and starting in response to vehicle speed.

10. The system of claim 7, further comprising additional instructions to adjust an amount of time to inhibit automatic engine stopping and starting in response to driver demand pedal position and a rate of change of driver demand pedal position.

11. The system of claim 7, further comprising additional instructions to adjust an amount of time to inhibit automatic engine stopping and starting in response to brake pedal position.

12. The system of claim 7, where the first threshold is an estimated value that is determined when a vehicle is operating in electric only mode from a time of a next engine pull down to a time of a next engine pull up.

13. The system of claim 7, further comprising additional instructions to reduce an actual total number of future engine starts in response to an actual total number of monitored engine stops and starts associated with road types.

14. A method for operating an engine, comprising:
authorizing a reduction in an actual total number of future engine starts via a controller in response to an actual total number of engine stops and starts that are categorized by road type, and where there is an engine starting metric associated with the road type; and
inhibiting automatically stopping the engine according to the authorization.

15. The method of claim 14, where the road types include highways, rural roads, and urban roads.

16. The method of claim 14, further comprising inhibiting automatic stopping of the engine in response to human user input to a machine interface.

17. The method of claim 14, further comprising dynamically adjusting an amount of time automatic engine stop inhibit is activated in response to brake pedal position.

18. The method of claim 14, further comprising dynamically adjusting an amount of time automatic engine stop inhibit is activated in response to vehicle speed.

* * * * *